B. F. FERGUSON.
COOKING VESSEL.
APPLICATION FILED SEPT. 8, 1909.
951,065.
Patented Mar. 1, 1910.
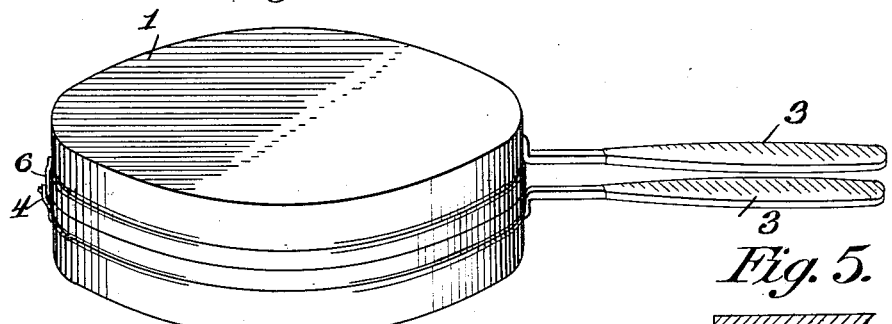
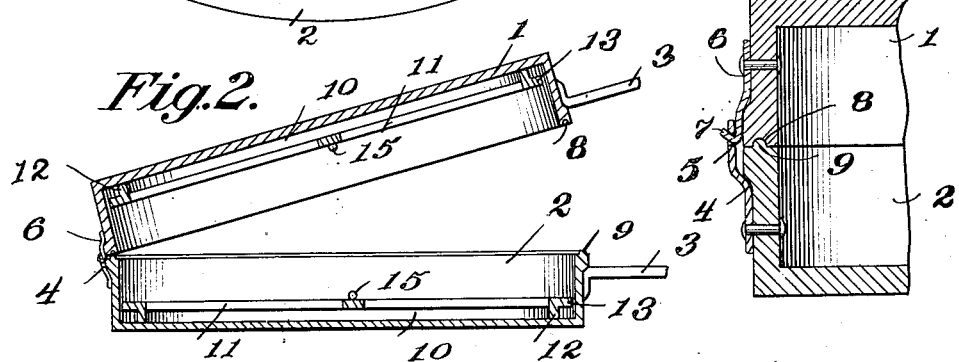
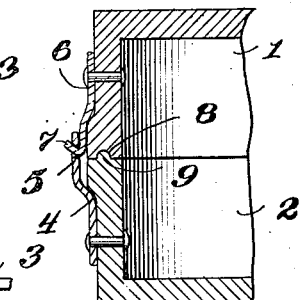
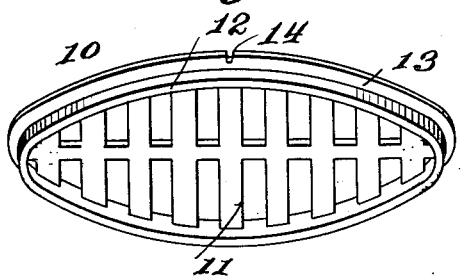
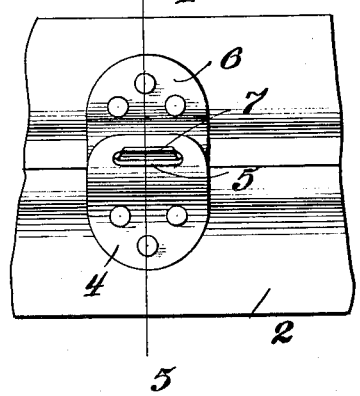
Inventor
Benjamin F. Ferguson
Witnesses
Horace H. Lybrand
K. Allen
By Victor J. Evans
Attorney

UNITED STATES PATENT OFFICE.

BENJAMIN F. FERGUSON, OF FAYETTE, MISSOURI.

COOKING VESSEL.

951,065.  Specification of Letters Patent.  Patented Mar. 1, 1910.

Application filed September 8, 1909. Serial No. 516,666.

*To all whom it may concern:*

Be it known that I, BENJAMIN F. FERGUSON, a citizen of the United States, residing at Fayette, in the county of Howard and State of Missouri, have invented new and useful Improvements in Cooking Vessels, of which the following is a specification.

This invention relates to a cooking vessel, and particularly to a broiler and toaster, the object in view being to provide a vessel which may be employed either for toasting bread or broiling meats without emission of odors and which when used for broiling will prevent waste of the meat juices and enable the meat to be turned to cook it thoroughly from both sides and at the same time automatically baste the meat so as to maintain it in a juicy condition.

A further object of the invention is to provide a device of this character which may be employed upon any kind of cook stove or open fire and which may be easily cleansed and manufactured and sold at a low cost.

The invention consists of the features of construction, combination and arrangement of parts hereinafter fully described and claimed, reference being had to the accompanying drawing, in which:—

Figure 1 is a perspective view of a broiler or toaster embodying my invention as closed for use. Fig. 2 is a vertical longitudinal section of the same with the parts arranged in position to be closed or disconnected. Fig. 3 is a perspective view of one of the grates. Fig. 4 is a fragmentary front elevation of the closed device. Fig. 5 is a section on line 5—5 of Fig. 4.

Referring to the drawing, my improved broiler or toaster comprises a preferably cylindrical pan or receptacle composed of two counterparts or duplicate sections 1 and 2, each having an open side. These sections are formed of cast or stamped metal, and each is provided at its rear with a handle 3. To the front of one of the sections, diametrically opposite the handle, is fixed a keeper plate 4 having a receiving slot 5, and similarly applied to the other section is a catch plate 6 having a hooked tongue 7 to engage said slot, whereby interengaging members are provided to enable the sections to be coupled and uncoupled as well as opened by relative pivotal and sliding movements in an obvious manner. The rim edge at the open side of one section is further provided with a groove 8 to receive a rib or bead 9 upon the rim edge of the open side of the other section, whereby a closed joint will be formed when the sections are closed to retain the juices, etc.

A grate 10 is provided for use within each section, each grate consisting of a perforate body portion 11 having a circumferential flange 12 at one side and a lateral flange 13 to respectively bear upon the closed side and annular body wall of the section within which it fits to properly hold said grate from shifting and space the perforate body from said portions of said section. The grates are comparatively shallow so that when fitted in position against the closed sides of the section an intervening chamber or space of adequate size will be formed for the reception of the bread to be toasted or the meat to be broiled. The flange 13 is provided at one point with a notch 14 to permit a lug 15 on the annular body of the section to pass through and engage the inner face of said flange, to hold the grate in applied position, and whereby the grate is adapted by the bayonet connection thus formed to be secured and released by a partial rotary movement in one direction or the other.

The sections are connected for use in the manner shown in Fig. 2, from which it will be seen that by a relative pivotal movement they may be opened and closed for insertion and removal of the bread or meat and that they may also be disconnected by withdrawing the hooked catch from the slotted keeper to adapt the parts to be readily cleansed after use. In toasting or broiling the receptacle is placed upon a stove or open fire with either section next the fire and by turning it over at proper intervals to alternately subject the sections to the direct heat both sides of the bread or meat will be thoroughly toasted or broiled. The closed joint between the receptacle sections insures the retention of heat and juices and it will be apparent that on turning the pan over the juices contained in the bottom thereof will fall upon and baste the meat. Hence the meat may be thoroughly cooked and yet maintained in a juicy condition.

I claim:—

A broiler or toaster comprising a pan formed of pivotally connected detachable sections, each provided with a handle, and grates detachably held within said sections, each consisting of a body portion having circumferential and lateral spacing flanges, one of said flanges having a bayonet joint connection with its section.

In testimony whereof I affix my signature in presence of two witnesses.

BENJAMIN F. FERGUSON.

Witnesses:
T. H. M. CRASEY,
T. HOWARD BRIGGS.